United States Patent
Greenway et al.

(10) Patent No.: US 9,524,397 B1
(45) Date of Patent: *Dec. 20, 2016

(54) INTER-SYSTEM DATA FORENSICS

(71) Applicant: Bank of America Corporation, Charlotte, NC (US)

(72) Inventors: Ryan M. Greenway, Charlotte, NC (US); Seyamak Amin, Dallas, TX (US); David Joa, San Francisco, CA (US); Yanghong Shao, Charlotte, NC (US); Tim Bendel, Charlotte, NC (US); Jangaiah Kurva, Hyderabad (IN); Dilip Nair, Charlotte, NC (US); Edward W. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,549

(22) Filed: Jul. 6, 2015

(51) Int. Cl.
*G06F 21/55* (2013.01)
*G06F 21/62* (2013.01)
*H04L 29/06* (2006.01)

(52) U.S. Cl.
CPC ......... *G06F 21/6227* (2013.01); *G06F 21/552* (2013.01); *H04L 63/10* (2013.01)

(58) Field of Classification Search
CPC ........ G06F 21/55; G06F 21/552; G06F 21/62; G06F 21/6227; G06F 2221/2101; G06F 3/065; H04L 63/10; H04L 63/14; H04L 63/1425

See application file for complete search history.

(56) References Cited

U.S. PATENT DOCUMENTS

| 7,543,333 | B2 * | 6/2009 | Pandit | G06F 21/31 709/224 |
| 7,660,793 | B2 | 2/2010 | Indeck et al. | |
| 7,779,113 | B1 * | 8/2010 | Samar | G06F 21/552 707/600 |
| 7,895,167 | B2 | 2/2011 | Berg et al. | |

(Continued)

OTHER PUBLICATIONS

Stallings, Cryptography and Network Security—Principles and Practices, 2003, Prentice Hall, 3$^{rd}$ Edition, pp. 569-581.*

(Continued)

*Primary Examiner* — Minh Dinh
(74) *Attorney, Agent, or Firm* — Banner & Witcoff, Ltd.; Michael A. Springs

(57) ABSTRACT

A computing platform may generate requests for log data stored on computing systems and may communicate the requests to the computing systems. The computing platform may receive the log data from the computing systems and may utilize the log data to generate records interrelating different data-access requests indicated by the log data. The computing platform may analyze the records to identify corresponding requests made by a user to multiple different computing systems and may determine an interrelationship between the corresponding requests. The computing platform may generate data indicating the multiple different computing systems and the interrelationship between the corresponding requests and may communicate the data to a computing device associated with at least one of the multiple different computing systems.

14 Claims, 8 Drawing Sheets

(56) References Cited

U.S. PATENT DOCUMENTS

| | | | |
|---|---|---|---|
| 7,930,314 B2 | 4/2011 | Gupta | |
| 8,073,806 B2 | 12/2011 | Garg et al. | |
| 8,156,101 B2 | 4/2012 | Indeck et al. | |
| 8,495,429 B2 | 7/2013 | Fu et al. | |
| 8,751,495 B2 | 6/2014 | Chung et al. | |
| 8,880,501 B2 | 11/2014 | Indeck et al. | |
| 8,924,328 B1 | 12/2014 | Kozlovsky et al. | |
| 2013/0159364 A1 | 6/2013 | Grider et al. | |
| 2013/0297346 A1* | 11/2013 | Kulkarni | G06F 21/6245 705/3 |
| 2013/0342756 A1 | 12/2013 | Xu et al. | |
| 2014/0019088 A1 | 1/2014 | Leonard et al. | |
| 2014/0019448 A1 | 1/2014 | Leonard et al. | |
| 2014/0019909 A1 | 1/2014 | Leonard et al. | |
| 2014/0026033 A1 | 1/2014 | Subramaniam et al. | |
| 2014/0156628 A1 | 6/2014 | Raichelgauz et al. | |
| 2014/0344622 A1 | 11/2014 | Huang et al. | |
| 2015/0019513 A1 | 1/2015 | Dey et al. | |
| 2016/0048937 A1* | 2/2016 | Mathura | G06Q 40/12 705/30 |

OTHER PUBLICATIONS

Denning, An Intrusion-Detection Model, IEEE, 1987.*
Statement RE: Related Application dated Jul. 6, 2015.

\* cited by examiner

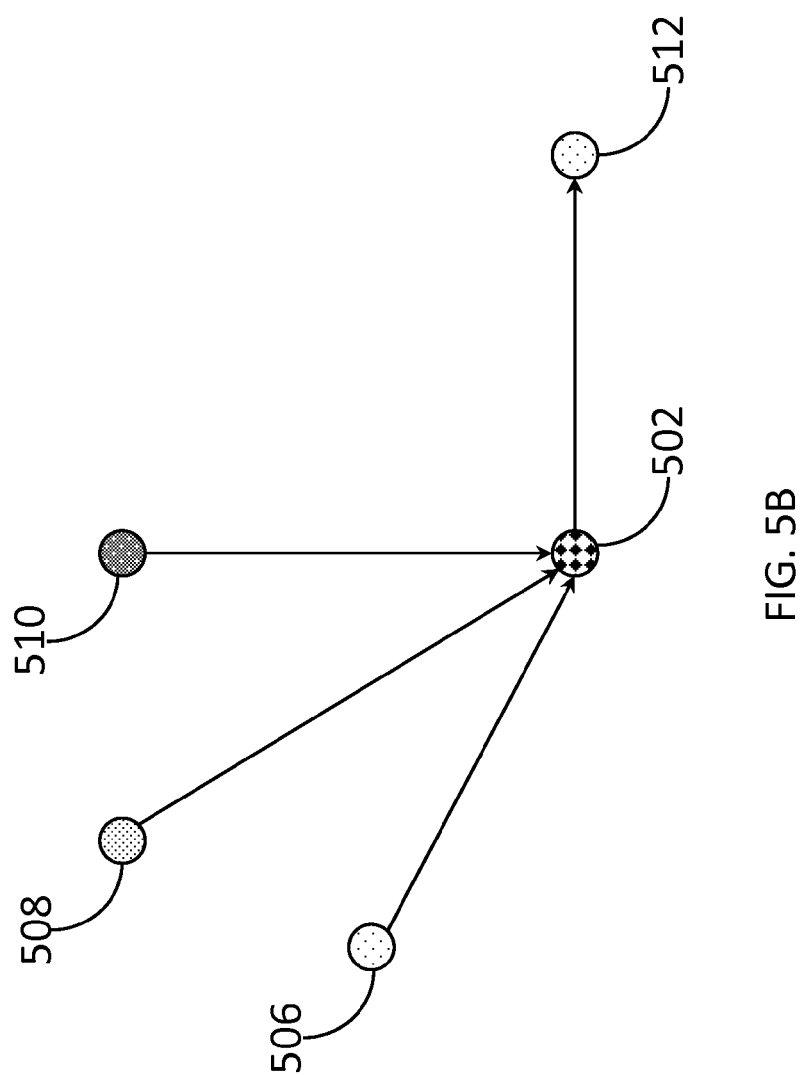

INTER-SYSTEM DATA FORENSICS

BACKGROUND

Many organizations utilize multiple different computing systems to maintain and store data. Such systems often support intercommunication of the data between the systems. While the ability to move data amongst the systems provides flexibility, it also presents challenges. For example, the systems typically include various copies, formats, or versions of the data, with one copy designated or regarded as the true, official, or record copy. In order to protect the integrity of this copy, protocols may be implemented governing how the copy may be manipulated or modified. As the complexity of the intercommunication between the systems increases, however, the effectiveness of these protocols may be compromised. Similarly, certain users may be granted limited privileges regarding particular data, but as intercommunication between the systems increases, the data may migrate away from the systems configured to enforce these privileges and their efficacy may diminish as a result. Accordingly, a need exists for inter-system data forensics.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may generate requests for log data stored on computing systems and may communicate the requests to the computing systems. The computing platform may receive the log data from the computing systems and may utilize the log data to generate records interrelating different data-access requests indicated by the log data. The computing platform may analyze the records to identify corresponding requests made by a user to multiple different computing systems and may determine an interrelationship between the corresponding requests. The computing platform may generate data indicating the multiple different computing systems and the interrelationship between the corresponding requests and may communicate the data to a computing device associated with at least one of the multiple different computing systems.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 5A and 5B depict aspects of various illustrative graphical depictions generated in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
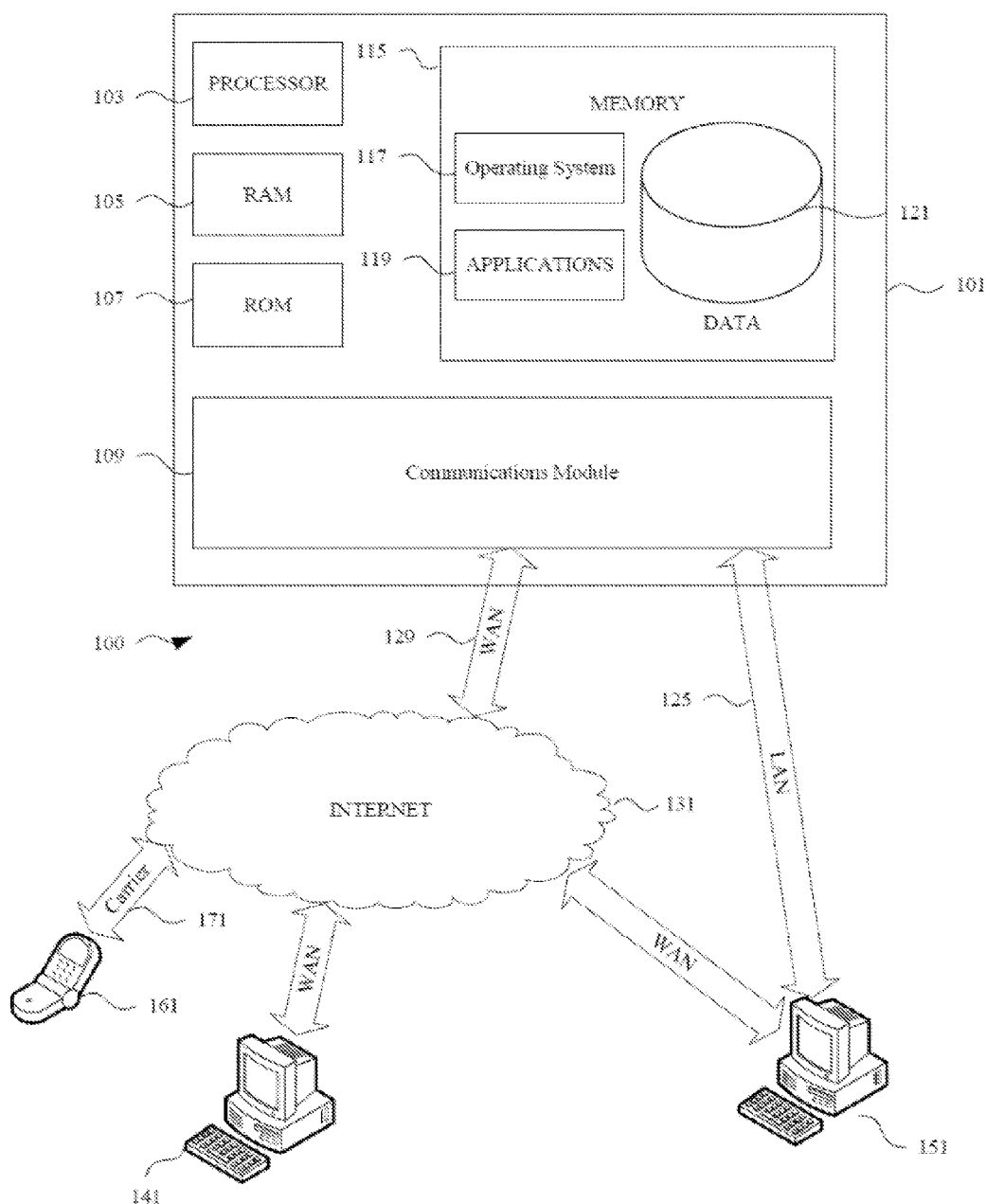
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
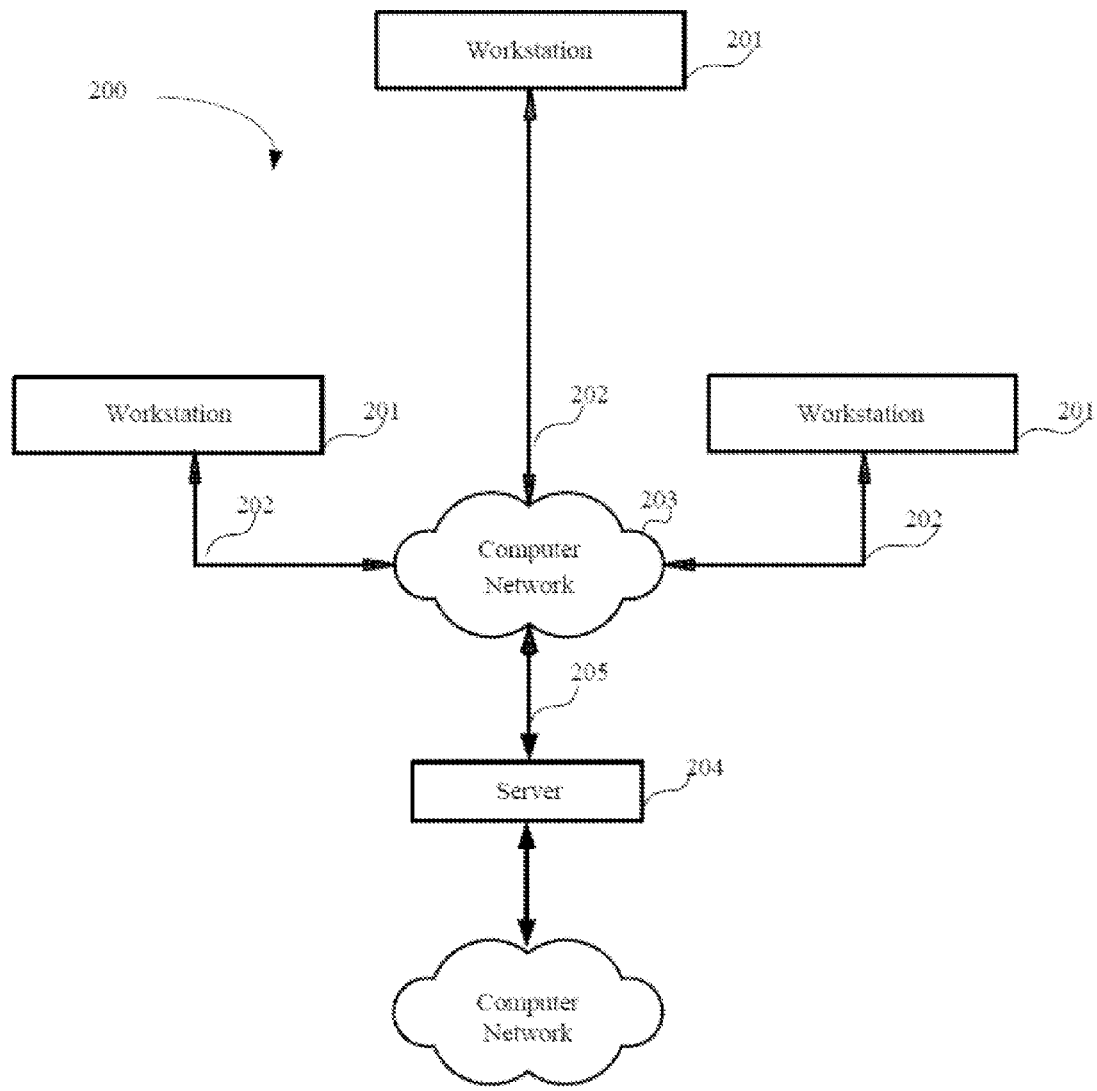
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
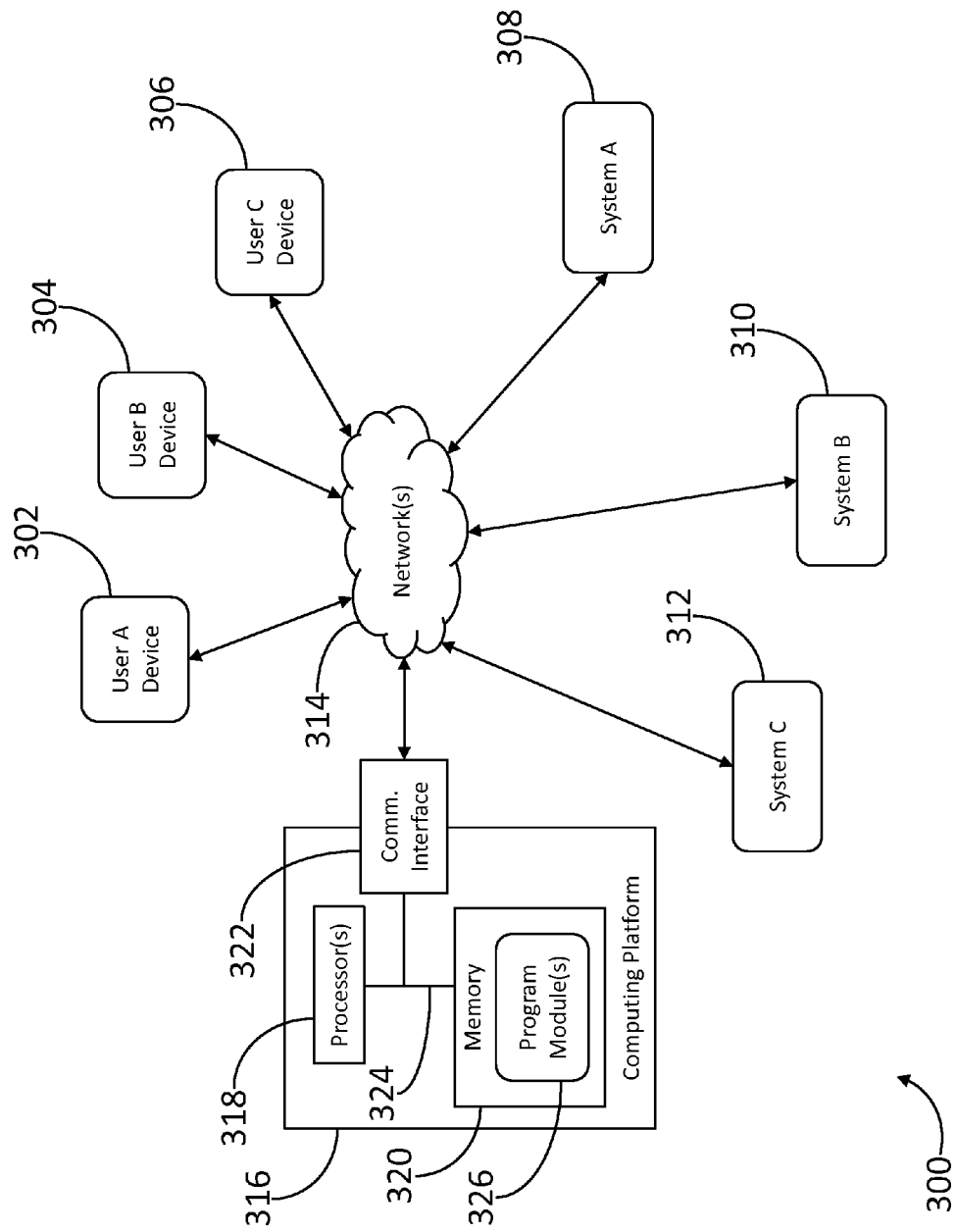
FIG. 3 depicts an illustrative computing environment for implementing inter-system data forensics in accordance with one or more example embodiments.

FIG. 3 depicts an illustrative computing environment for implementing inter-system data forensics in accordance with one or more example embodiments. Referring to FIG. 3, computing environment 300 may include one or more computing devices or systems. For example, computing environment 300 may include computing devices 302, 304, and 306 and computing systems 308, 310, and 312. Computing devices 302, 304, and 306 may be any type of computing device (e.g., desktop computer, laptop computer, tablet computer, smart phone, server, server blade, mainframe, virtual machine, or the like) configured to perform one or more of the functions described herein, and computing systems 308, 310, and 312 may comprise one or more of such types of computing devices. Computing environment 300 may also include one or more networks. For example, computing environment 300 may include network(s) 314, which may include one or more sub-networks (e.g., LANs, WANs, VPNs, or the like) and may interconnect one or more of computing devices 302, 304, and 306 and computing systems 308, 310, and 312.

Computing environment 300 may also include computing platform 316, which in some embodiments, may include one or more of computing devices 302, 304, and 306 and computing systems 308, 310, and 312. Computing platform 316 may include one or more processor(s) 318, memory 320, communication interface 322, and/or data bus 324. Data bus 324 may interconnect processor(s) 318, memory 320, and/or communication interface 322. Communication interface 322 may be a network interface configured to support communications between computing platform 316 and network(s) 314 (or one or more sub-networks thereof) (e.g., communications between one or more of computing devices 302, 304, and 306 and computing systems 308, 310, and 312). Memory 320 may include program module(s) 326, which may comprise instructions that when executed by processor(s) 318 cause computing platform 316 to perform one or more functions described herein.

Figure 4A:
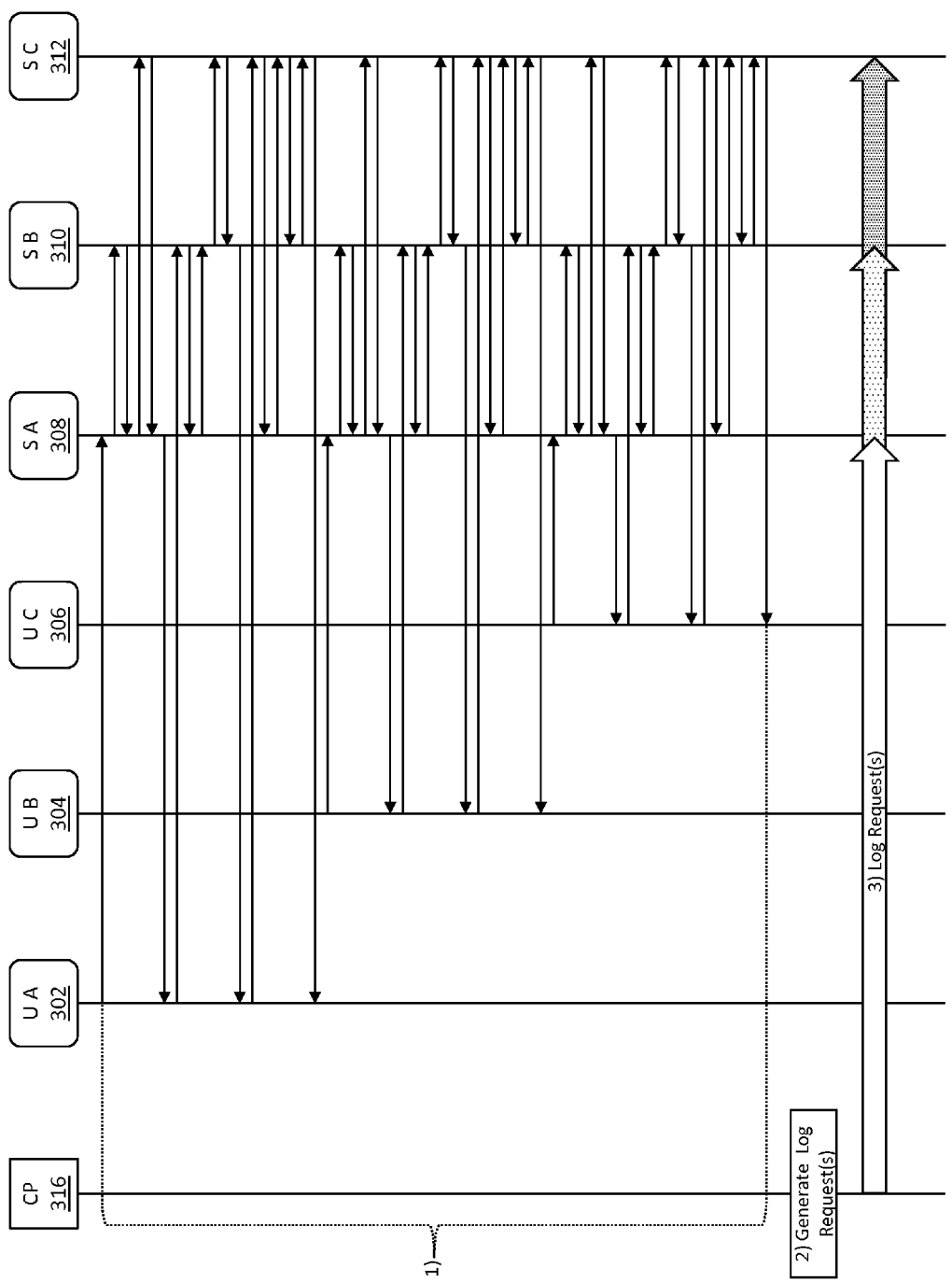
FIGS. 4A and 4B depict an illustrative event sequence for implementing inter-system data forensics in accordance with one or more example embodiments.
Figure 4B:
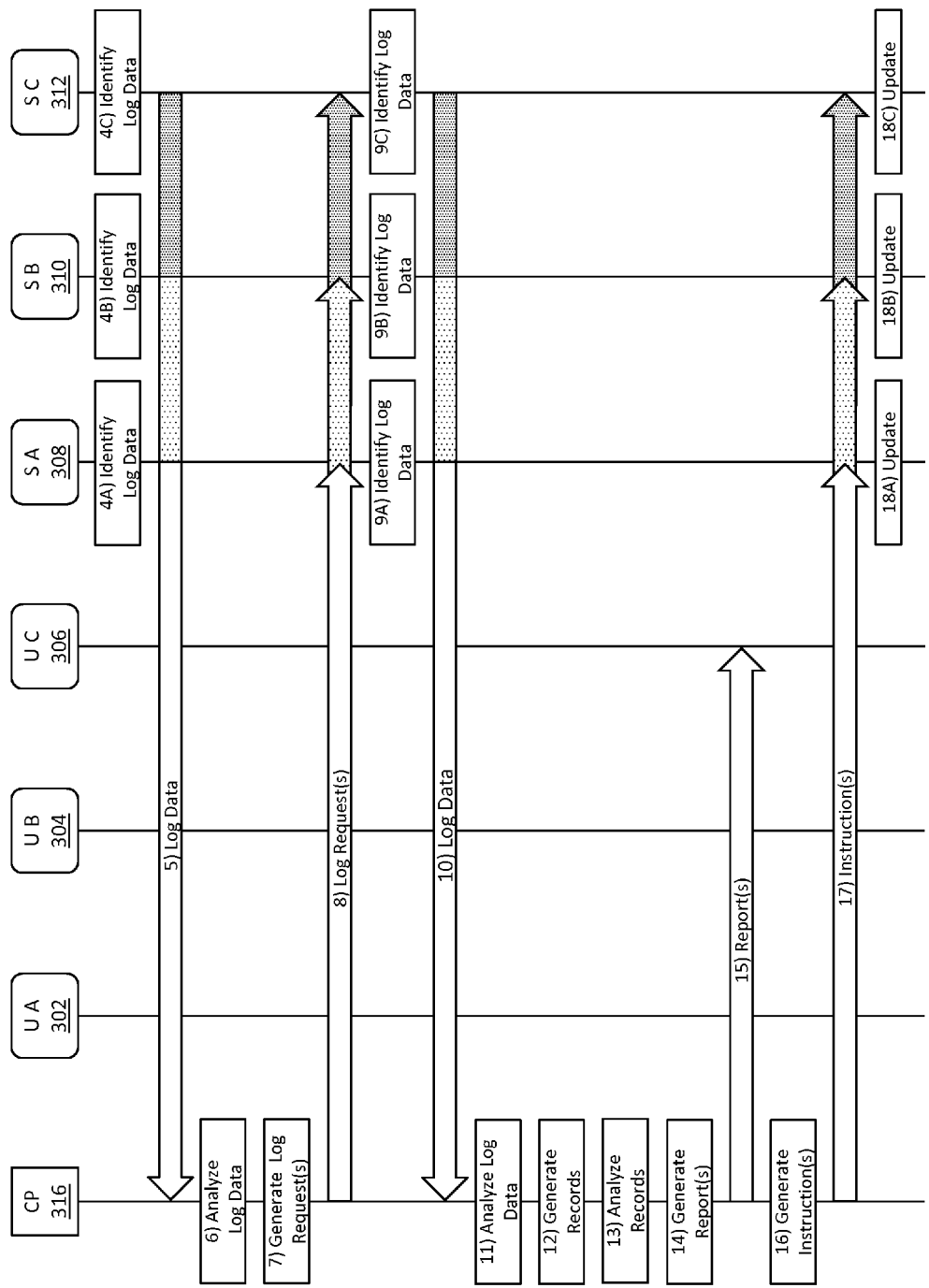

FIGS. 4A and 4B depict an illustrative event sequence for implementing inter-system data forensics in accordance with one or more example embodiments. Referring to FIG. 4A, at step 1, computing devices 302, 304, and 306 may communicate one or more data-access requests to one or more of computing systems 308, 310, and 312. For example, each of computing devices 302, 304, and 306 may communicate to each of computing systems 308, 310, and 312 a data-access request (e.g., a request to read data stored on one or more of computing systems 308, 310, and 312 or a request to write data to on one or more of computing systems 308, 310, and 312). In some embodiments, one or more of computing devices 302, 304, or 306 may communicate an instruction set (e.g., a program, application, script, series of instructions, or the like) to one or more of computing systems 308, 310, or 312 that when executed by the computing system may cause the computing system to communicate a data-access request to one or more other computing systems of computing environment 300. For example, computing device 302 may communicate an instruction set to computing system 308 that when executed by computing system 308 may cause computing system 308 to communicate one or more data-access requests to computing systems 310 or 312 (e.g., on behalf of computing device 302). Similarly, computing device 302 may communicate an instruction set to computing system 310 that when executed by computing system 310 may cause computing system 310 to communicate one or more data-access requests to computing systems 308 or 312 (e.g., on behalf of computing device 302), and/or computing device 302 may communicate an instruction set to computing system 312 that when executed by computing system 312 may cause computing system 312 to communicate one or more data-access requests to computing systems 308 or 310 (e.g., on behalf of computing device 302).

Additionally or alternatively, computing device 304 may communicate an instruction set to computing system 308 that when executed by computing system 308 may cause computing system 308 to communicate one or more data-access requests to computing systems 310 or 312 (e.g., on behalf of computing device 304), computing device 304 may communicate an instruction set to computing system 310 that when executed by computing system 310 may cause computing system 310 to communicate one or more data-access requests to computing systems 308 or 312 (e.g., on behalf of computing device 304), computing device 304 may communicate an instruction set to computing system 312 that when executed by computing system 312 may cause computing system 312 to communicate one or more data-access requests to computing systems 308 or 310 (e.g., on behalf of computing device 304), computing device 306 may communicate an instruction set to computing system 308 that when executed by computing system 308 may cause computing system 308 to communicate one or more data-access requests to computing systems 310 or 312 (e.g., on behalf of computing device 306), computing device 306 may communicate an instruction set to computing system 310 that when executed by computing system 310 may cause computing system 310 to communicate one or more data-access requests to computing systems 308 or 312 (e.g., on behalf of computing device 306), and/or computing device 306 may communicate an instruction set to computing system 312 that when executed by computing system 312 may cause computing system 312 to communicate one or more data-access requests to computing systems 308 or 310 (e.g., on behalf of computing device 304).

Each of computing systems 308, 310, and 312 may generate log data for each of the data-access requests its processes. For example, in some embodiments, one or more of computing systems 308, 310, and 312 may be configured to maintain a system log comprising entries corresponding to data-access requests made by multiple different users (e.g., utilizing one or more of computing devices 302, 304, and 306) for data stored on the computing system. Additionally or alternatively, one or more of computing systems 308, 310, and 312 may be configured to generate, and store in a memory, a log file while executing an instruction set communicated to it by one or more of computing devices 302, 304, or 306.

At step 2, computing platform 316 may generate one or more requests for log data and, at step 3, may communicate (e.g., via communication interface 322 and network(s) 314) the request(s) to one or more of computing systems 308, 310, or 312. Referring to FIG. 4B, at steps 4A, 4B, and 4C, computing systems 308, 310, and/or 312 may identify the requested log data and, at step 5, may communicate the requested log data to computing platform 316, which may receive the log data (e.g., via communication interface 322).

At step 6, computing platform 316 may analyze the received log data and, at step 7, may generate, based on the analysis, one or more additional requests for log data. For example, the received log data may comprise data from one or more of the system logs maintained by computing systems 308, 310, and/or 312, and computing platform 316 may analyze the received log data, identify a user associated with one or more data-access requests indicated by the system log(s), and generate one or more requests for log data stored in one or more log files associated with one or more instruction sets communicated by the user to the computing system(s). At step 8, computing platform 316 may communicate (e.g., via communication interface 322 and network (s) 314) the additional request(s) to one or more of computing systems 308, 310, or 312, which, at steps 9A, 9B, and 9C may identify the requested log data and, at step 10, may communicate the requested log data to computing platform 316, which may receive the log data (e.g., via communication interface 322).

At step 11, computing platform 316 may analyze the log data (e.g., the log data received in steps 5 and/or 10). For example, computing platform 316 may parse the log data to identify data-access requests and one or more associated parameters (e.g., one or more users or accounts associated with the requests, one or more computing devices and/or systems associated with the requests, one or more instruction sets associated with the requests, one or more times associated with the requests, an ordering of the requests, or the like). At step 12, based on the analysis, computing platform 316 may generate records interrelating different data-access requests indicated by the log data. For example, the log data may comprise data formatted in accordance with various different protocols utilized by computing systems 308, 310, and 312, and computing platform 316 may be configured to convert the log data into similarly formatted records indicating the data-access requests included in the log data and comprising data that interrelates the data-access requests (e.g., based on their associated parameters). At step 13, computing platform 316 may analyze the records to identify from amongst the plurality of different data-access requests, corresponding requests made by a user to multiple different computing systems and may determine, based on the analysis, an interrelationship between the corresponding requests. At step 14, computing platform 316 may generate data (e.g., one or more messages, reports, or the like) indicating the multiple different computing systems and the interrelationship between the corresponding requests and, at step 15, may communicate (e.g., via communication interface 322 and network(s) 314) the data to computing device 306, which may, for example, be associated with an administrator of one or more of computing systems 308, 310, or 312.

Figure 5A:
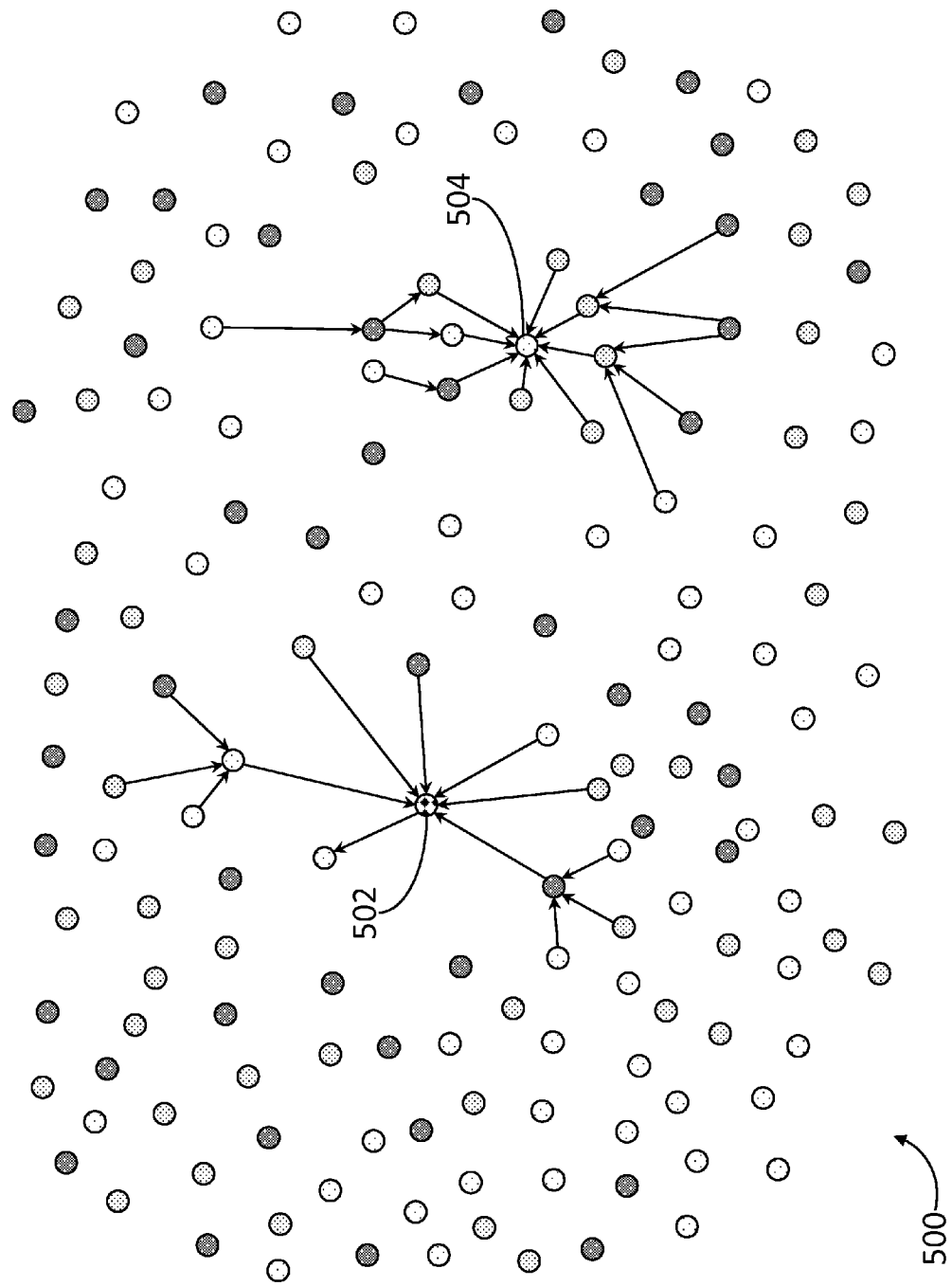

In some embodiments, the data (e.g., the one or more messages, reports, or the like) may comprise a graphical depiction of the multiple different computing systems and the interrelationship between the corresponding requests or an instruction set configured to cause a computing device to display such a graphical depiction. For example, referring to FIG. 5A, graphical depiction 500 may comprise a plurality of nodes depicting one or more of computing systems 308, 310, or 312 (and/or resources associated therewith (e.g., files, tables, applications, or the like)) and/or one or more of computing devices 302, 304, or 306 (and/or attributes associated therewith (e.g., user, account, or the like)). Graphical depiction 500 may further comprise a plurality of edges connecting one or more of the nodes and depicting the corresponding requests. In some embodiments, graphical depiction 500 may visually distinguish (e.g., via color, shading, or the like) nodes based on their association with a particular computing system (and/or resource associated therewith) or computing device. Additionally or alternatively, one or more of the edges included within graphical depiction 500 may visually distinguish (e.g., by including a directional indicator, or the like) whether data was written to, or requested from, nodes connected by the edge(s).

It will be appreciated that a user (e.g., an administrator of computing environment 300) may utilize graphical depiction 500 to gain insight into the intercommunication of data within computing environment 300. For example, node 502 may correspond to a particular computing device (and/or attribute associated therewith), and graphical depiction 500 may illustrate the communication of particular data from (and/or via) one or more of computing systems 308, 310, or 312 to the computing device. Similarly, node 504 may correspond to a particular computing system (and/or resource associated therewith), and graphical depiction 500 may illustrate the communication of particular data from (and/or via) one or more of computing systems 308, 310, or 312 to the computing system.

For example, referring to FIG. 5B, the illustrated portion of graphical depiction 500 may include nodes 502, 506, 508, 510, and 512. Node 502 may correspond to computing device 302, nodes 506 and 512 may correspond to computing system 308, node 508 may correspond to computing system 310, and node 510 may correspond to computing system 312. It will be appreciated that by observing the illustrated portion an administrator of computing environment 300 may readily identify the communication of data from computing systems 308, 310, and 312 to computing device 302 and the subsequent communication of corresponding data back into computing system 308. Such identification may be valuable, for example, because computing system 308 may maintain a copy of the data designated or regarded as the true, official, or record copy, and the communication of data via computing device 302 may indicate that one or more protocols aimed at preserving the integrity of such a copy may be compromised. Similarly, numerous occurrences of the same pattern (e.g., the same or similar data being communicated from computing systems 308, 310, and 312 to a computing device, followed by a corresponding communication of data from the computing device to computing system 308) may indicate that redundant communication and/or processing may be occurring within computing environment 300 (e.g., it may be more efficient to configure computing system 308 to perform the underlying data manipulation).

Returning to FIG. 4B, at step 16, computing platform 316 may generate data comprising one or more instruction sets associated with access rights of the user, and, at step 17, computing platform 316 may communicate (e.g., via communication interface 322 and network(s) 314) the data to one or more of computing systems 308, 310, or 312, which at steps 18A, 18B, and 18C may execute instructions included within the set(s). For example, one or more of computing systems 308, 310, or 312 may be configured to manage access rights of the user to data stored on or more of computing systems 308, 310, or 312, and the instructions may be configured to cause the computing system to flag and/or modify one or more of the access rights based on the interrelationship between the corresponding requests.

Figure 6:
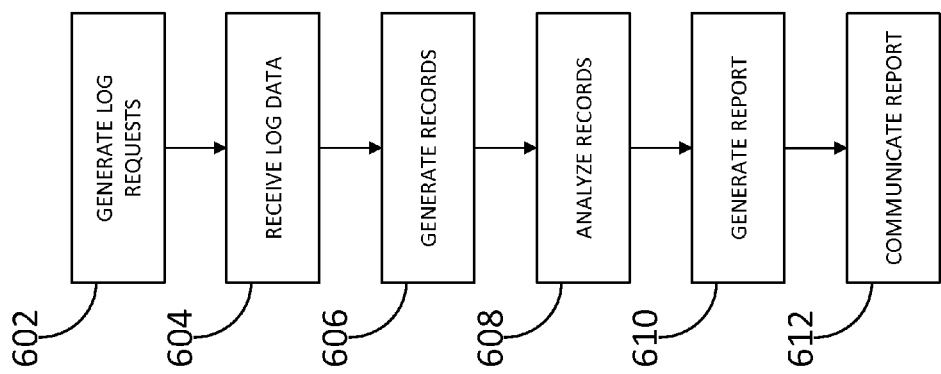
FIG. 6 depicts an illustrative method for implementing inter-system data forensics in accordance with one or more example embodiments.

FIG. 6 depicts an illustrative method for implementing inter-system data forensics in accordance with one or more example embodiments. Referring to FIG. 6, at step 602, requests for log data stored on computing systems may be generated. For example, computing platform 316 may generate requests for log data stored on computing systems 308, 310, and 312. At step 604, the log data may be received. For example, computing platform 316 may receive the log data from computing systems 308, 310, and 312. At step 606, records interrelating different data-access requests indicated by the log data may be generated. For example, computing platform 316 may generate records interrelating different data-access requests indicated by the log data received from computing systems 308, 310, and 312. At step 608, the records may be analyzed to identify corresponding requests made by a user to multiple different computing systems and to determine an interrelationship between the corresponding requests. For example, computing platform 316 may analyze the records to identify corresponding requests made by a user to one or more of computing systems 308, 310, and 312 and to determine an interrelationship between the corresponding requests. At step 610, a report (e.g., data comprising a report) indicating the multiple different computing systems and the interrelationship between the corresponding requests may be generated. For example, computing platform 316 may generate a report indicating the one or more of computing systems 308, 310, and 312 and the interrelationship between the corresponding requests. At step 612, the report may be communicated to a computing device associated with at least one of the multiple different computing systems. For example, computing platform 316 may communicate the report to computing device 306.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    generating, by at least one processor of a computing platform, a plurality of requests for log data stored on a plurality of computing systems;
    communicating, via a communication interface of the computing platform and to the plurality of computing systems, the plurality of requests;
    receiving, via the communication interface, from the plurality of computing systems, and responsive to the plurality of requests, the log data;
    generating, by the at least one processor and based on the log data, a plurality of records that interrelate a plurality of different data-access requests indicated by the log data;
    analyzing, by the at least one processor, the plurality of records to: identify, from amongst the plurality of different data-access requests, corresponding requests made by a user to multiple different computing systems of the plurality of computing systems; and determine an interrelationship between the corresponding requests;
    generating, by the at least one processor, data indicating the multiple different computing systems and the interrelationship between the corresponding requests; and
    communicating, via the communication interface and to a computing device associated with at least one of the multiple different computing systems, the data,
    wherein:
        a first computing system of the plurality of computing systems maintains a system log comprising entries corresponding to data-access requests made by multiple different users for data stored on the first computing system;
        a second computing system of the plurality of computing systems comprises a memory storing a log file generated by the second computing system while executing an instruction set communicated to the second computing system by a device utilized by the user;
        generating the plurality of requests comprises generating a request for data from the system log and a request for data from the log file;
        receiving the log data comprises receiving, from the first computing system, data from the system log, and receiving, from the second computing system, data from the log file;
        generating the plurality of records comprises generating, based on the data from the system log, a first portion of the plurality of records, and generating, based on the data from the log file, a second portion of the plurality of records;
        the corresponding requests comprise: a data-access request, indicated by the first portion of the plurality of records, by the user for the data stored on the first computing system; and a data-access request, indicated by the second portion of the plurality of records, by the instruction set for data stored on a computing system different from the first computing system; and
        the interrelationship comprises an interrelationship between the data stored on the first computing system and the data stored on the computing system different from the first computing system.

2. The method of claim 1, wherein:
    the data-access request by the user comprises a request to read the data stored on the first computing system; and
    analyzing the plurality of records to determine the interrelationship comprises determining that the instruction set caused the second computing system to write the data stored on the first computing system to the computing system different from the first computing system.

3. The method of claim 1, wherein:
    the data-access request by the user comprises a request to read one or more elements of the data stored on the first computing system; and
    analyzing the plurality of records to determine the interrelationship comprises determining that the instruction set caused the second computing system to read, from the data stored on the computing system different from the first computing system, data comprising the one or more elements.

4. The method of claim 1, wherein:
    receiving the log data comprises receiving the data from the system log prior to receiving the data from the log file; and
    generating the plurality of requests comprises:
        analyzing the data from the system log to identify, from amongst the multiple different users, the user; and
        responsive to identifying the user, generating the request for the data from the log file.

5. A method comprising:
generating, by at least one processor of a computing platform, a plurality of requests for log data stored on a plurality of computing systems;
communicating, via a communication interface of the computing platform and to the plurality of computing systems, the plurality of requests;
receiving, via the communication interface, from the plurality of computing systems, and responsive to the plurality of requests, the log data;
generating, by the at least one processor and based on the log data, a plurality of records that interrelate a plurality of different data-access requests indicated by the log data;
analyzing, by the at least one processor, the plurality of records to: identify, from amongst the plurality of different data-access requests, corresponding requests made by a user to multiple different computing systems of the plurality of computing systems; and determine an interrelationship between the corresponding requests;
generating, by the at least one processor, data indicating the multiple different computing systems and the interrelationship between the corresponding requests; and
communicating, via the communication interface and to a computing device associated with at least one of the multiple different computing systems, the data,
wherein:
the computing device is configured to manage access rights of the user to data stored on the at least one of the multiple different computing systems; and
the data indicating the multiple different computing systems and the interrelationship between the corresponding requests comprises an instruction set configured to cause the computing device to modify one or more of the access rights.

6. A method comprising:
generating, by at least one processor of a computing platform, a plurality of requests for log data stored on a plurality of computing systems;
communicating, via a communication interface of the computing platform and to the plurality of computing systems, the plurality of requests;
receiving, via the communication interface, from the plurality of computing systems, and responsive to the plurality of requests, the log data;
generating, by the at least one processor and based on the log data, a plurality of records that interrelate a plurality of different data-access requests indicated by the log data;
analyzing, by the at least one processor, the plurality of records to: identify, from amongst the plurality of different data-access requests, corresponding requests made by a user to multiple different computing systems of the plurality of computing systems; and determine an interrelationship between the corresponding requests;
generating, by the at least one processor, data indicating the multiple different computing systems and the interrelationship between the corresponding requests; and
communicating, via the communication interface and to a computing device associated with at least one of the multiple different computing systems, the data,
wherein:
the computing device is configured to manage access rights of the user to data stored on the at least one of the multiple different computing systems; and
the data indicating the multiple different computing systems and the interrelationship between the corresponding requests comprises an instruction set configured to cause the computing device to flag one or more of the access rights.

7. A method comprising:
generating, by at least one processor of a computing platform, a plurality of requests for log data stored on a plurality of computing systems;
communicating, via a communication interface of the computing platform and to the plurality of computing systems, the plurality of requests;
receiving, via the communication interface, from the plurality of computing systems, and responsive to the plurality of requests, the log data;
generating, by the at least one processor and based on the log data, a plurality of records that interrelate a plurality of different data-access requests indicated by the log data;
analyzing, by the at least one processor, the plurality of records to: identify, from amongst the plurality of different data-access requests, corresponding requests made by a user to multiple different computing systems of the plurality of computing systems; and determine an interrelationship between the corresponding requests;
generating, by the at least one processor, data indicating the multiple different computing systems and the interrelationship between the corresponding requests; and
communicating, via the communication interface and to a computing device associated with at least one of the multiple different computing systems, the data,
wherein the data indicating the multiple different computing systems and the interrelationship between the corresponding requests comprises an instruction set configured to cause the computing device to display a graphical depiction of the multiple different computing systems and the interrelationship between the corresponding requests.

8. The method of claim 7, wherein the graphical depiction comprises:
a plurality of nodes depicting the multiple different computing systems; and
a plurality of edges depicting the corresponding requests, each edge of the plurality of edges connecting a node of the plurality of nodes to another node of the plurality of nodes.

9. A computing platform comprising:
at least one processor;
a communication interface; and
a memory comprising instructions that when executed by the at least one processor cause the computing platform to:
generate a plurality of requests for log data stored on a plurality of computing systems;
communicate, via the communication interface and to the plurality of computing systems, the plurality of requests;
receive, via the communication interface, from the plurality of computing systems, and responsive to the plurality of requests, the log data;
generate, based on the log data, a plurality of records that interrelate a plurality of different data-access requests indicated by the log data;
analyze the plurality of records to: identify, from amongst the plurality of different data-access requests, corresponding requests made by a user to multiple different computing systems of the plurality of computing systems; and determine an interrelationship between the corresponding requests;

generate data indicating the multiple different computing systems and the interrelationship between the corresponding requests; and communicate, via the communication interface and to a computing device associated with at least one of the multiple different computing systems, the data, wherein:
a first computing system of the plurality of computing systems maintains a system log comprising entries corresponding to data-access requests made by multiple different users for data stored on the first computing system;

a second computing system of the plurality of computing systems comprises a memory storing a log file generated by the second computing system while executing an instruction set communicated to the second computing system by a device utilized by the user; and the instructions, when executed by the at least one processor, cause the computing platform to:
generate a request for data from the system log;
generate a request for data from the log file;
receive, from the first computing system, data from the system log;
receive, from the second computing system, data from the log file;
generate, based on the data from the system log, a first portion of the plurality of records; and
generate, based on the data from the log file, a second portion of the plurality of records, and wherein:
the corresponding requests comprise: a data-access request, indicated by the first portion of the plurality of records, by the user for the data stored on the first computing system; and a data-access request, indicated by the second portion of the plurality of records, by the instruction set for data stored on a computing system different from the first computing system; and the interrelationship comprises an interrelationship between the data stored on the first computing system and the data stored on the computing system different from the first computing system.

10. The computing platform of claim 9, wherein:
the data-access request by the user comprises a request to read the data stored on the first computing system; and
the instructions, when executed by the at least one processor, cause the computing platform to determine, based on analyzing the records, that the instruction set caused the second computing system to write the data stored on the first computing system to the computing system different from the first computing system.

11. The computing platform of claim 9, wherein:
the data-access request by the user comprises a request to read one or more elements of the data stored on the first computing system; and
the instructions, when executed by the at least one processor, cause the computing platform to determine, based on analyzing the records, that the instruction set caused the second computing system to read, from the data stored on the computing system different from the first computing system, data comprising the one or more elements.

12. One or more non-transitory computer-readable media comprising instructions that when executed by at least one processor of a computing platform comprising the at least one processor and a communication interface cause the computing platform to:
generate a plurality of requests for log data stored on a plurality of computing systems;
communicate, via the communication interface and to the plurality of computing systems, the plurality of requests;
receive, via the communication interface, from the plurality of computing systems, and responsive to the plurality of requests, the log data;
generate, based on the log data, a plurality of records that interrelate a plurality of different data-access requests indicated by the log data;
analyze the plurality of records to: identify, from amongst the plurality of different data-access requests, corresponding requests made by a user to multiple different computing systems of the plurality of computing systems; and determine an interrelationship between the corresponding requests;
generate data indicating the multiple different computing systems and the interrelationship between the corresponding requests; and
communicate, via the communication interface and to a computing device associated with at least one of the multiple different computing systems, the data, wherein:
a first computing system of the plurality of computing systems maintains a system log comprising entries corresponding to data-access requests made by multiple different users for data stored on the first computing system;

a second computing system of the plurality of computing systems comprises a memory storing a log file generated by the second computing system while executing an instruction set communicated to the second computing system by a device utilized by the user; and the instructions, when executed by the at least one processor, cause the computing platform to:
generate a request for data from the system log;
generate a request for data from the log file;
receive, from the first computing system, data from the system log;
receive, from the second computing system, data from the log file;
generate, based on the data from the system log, a first portion of the plurality of records; and
generate, based on the data from the log file, a second portion of the plurality of records, and wherein:
the corresponding requests comprise: a data-access request, indicated by the first portion of the plurality of records, by the user for the data stored on the first computing system; and a data-access request, indicated by the second portion of the plurality of records, by the instruction set for data stored on a computing system different from the first computing system; and the interrelationship comprises an interrelationship between the data stored on the first computing system and the data stored on the computing system different from the first computing system.

13. The one or more non-transitory computer-readable media of claim 12, wherein:
the data-access request by the user comprises a request to read the data stored on the first computing system; and the instructions, when executed by the at least one processor, cause the computing platform to determine, based on analyzing the records, that the instruction set caused the second computing system to write the data stored on the first computing system to the computing system different from the first computing system.

14. The one or more non-transitory computer-readable media of claim 12, wherein:
the data-access request by the user comprises a request to read one or more elements of the data stored on the first computing system; and
the instructions, when executed by the at least one processor, cause the computing platform to determine, based on analyzing the records, that the instruction set caused the second computing system to read, from the data stored on the computing system different from the first computing system, data comprising the one or more elements.

\* \* \* \* \*